US009608485B2

(12) United States Patent
Yamagishi et al.

(10) Patent No.: US 9,608,485 B2
(45) Date of Patent: Mar. 28, 2017

(54) ROTOR FOR ROTATING ELECTRICAL MACHINE, ROTATING ELECTRIC MACHINE, AND METHOD FOR PRODUCING ROTOR FOR ROTATING ELECTRICAL MACHINE WITH MAGNET HAVING SURFACES TILTED WITH RESPECT TO MAGNET INSERTION HOLE (75) Inventors: Yoshitada Yamagishi, Toyota (JP); Yuta Watanabe, Nishio (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 459 days.

(21) Appl. No.: 14/114,791

(22) PCT Filed: Jun. 9, 2011

(86) PCT No.: PCT/JP2011/063245
§ 371 (c)(1),
(2), (4) Date: Oct. 30, 2013

(87) PCT Pub. No.: WO2012/169043
PCT Pub. Date: Dec. 13, 2012

(65) Prior Publication Data
US 2014/0077652 A1    Mar. 20, 2014

(51) Int. Cl.
*H02K 1/27* (2006.01)
*H02K 1/28* (2006.01)

(52) U.S. Cl.
CPC .................. *H02K 1/28* (2013.01); *H02K 1/27* (2013.01); *H02K 1/2766* (2013.01)

(58) Field of Classification Search
CPC   H02K 1/27; H02K 1/28; H02K 1/276; H02K 1/2766; H02K 1/2773

USPC ............ 310/156.21, 156.23, 156.38, 156.47, 310/156.53, 156.56, 156.57
See application file for complete search history.

(56) References Cited

U.S. PATENT DOCUMENTS

| 6,384,504 B1 | 5/2002 | Ehrhart et al. |
| 2009/0045689 A1 | 2/2009 | Haruno et al. |

FOREIGN PATENT DOCUMENTS

| DE | 19737391 A1 | | 3/1999 | |
| JP | 2002-238190 A | | 8/2002 | |
| JP | 2002238190 A | * | 8/2002 | ............... H02K 1/27 |
| JP | 2005-094845 A | | 4/2005 | |
| JP | 2008-109777 A | | 5/2008 | |

(Continued)

OTHER PUBLICATIONS

Machine translation of JP 2002238190 A (Aug. 2002).*

*Primary Examiner* — Michael Andrews
(74) *Attorney, Agent, or Firm* — Sughrue Mion, PLLC (57) ABSTRACT Provided is a rotor for a rotating electrical machine which is capable of minimizing increases in eddy current losses via a magnet, while making insulating film processing of the surface of the magnet unnecessary. The rotor for the rotating electrical machine includes: a rotor core having a magnet insertion hole extending inside; a magnet inserted in the magnet insertion hole; and an insulating filler which is filled between the inner wall of the magnet insertion hole and the magnet so as to secure the magnet. The magnet is secured by the filler in such a manner that the surface of the magnet inside the magnet insertion hole is in an inclined position with respect to the extending direction of the inner wall of the magnet insertion hole.

10 Claims, 9 Drawing Sheets (56) References Cited

FOREIGN PATENT DOCUMENTS

| | | |
|---|---|---|
| JP | 2010-183692 A | 8/2010 |
| JP | 2010-206882 A | 9/2010 |
| JP | 2011-004529 A | 1/2011 |
| WO | 2008/154358 A1 | 12/2008 |

\* cited by examiner

ROTOR FOR ROTATING ELECTRICAL MACHINE, ROTATING ELECTRIC MACHINE, AND METHOD FOR PRODUCING ROTOR FOR ROTATING ELECTRICAL MACHINE WITH MAGNET HAVING SURFACES TILTED WITH RESPECT TO MAGNET INSERTION HOLE

CROSS REFERENCE TO RELATED APPLICATIONS

This application is a National Stage of International Application No. PCT/JP2011/063245 filed Jun. 9, 2011, the contents of all of which are incorporated herein by reference in their entirety.

TECHNICAL FIELD

The present invention relates to rotary electric machine rotors, rotary electric machines themselves, and methods for manufacturing rotary electric machine rotors, and in particular, to a rotary electric machine rotor or the like with a built-in permanent magnet.

BACKGROUND ART

Conventionally, rotors including a built-in permanent magnet are known for rotary electric machines such as motors and power generators. This type of rotor is also called an "Interior Permanent Magnet (IPM) type rotor". In such an IPM type rotor, a rotor core formed from a cylindrical magnet body includes a magnet insertion hole which extends in an axial direction near an inner side of an outer circumferential surface of the rotor core. A permanent magnet is inserted inside the magnet insertion hole and adhesively fixed with a resin material.

For example, JP 2011-4529 A (Patent Document 1) discloses an IPM type rotor. In this rotor, a cylindrical rotor core in which electromagnetic steel plates 1 are laminated internally includes an embedded permanent magnet forming magnetic poles. Two end plates are provided at respective ends of the rotor core. The rotor core and the magnet are fixed by the end plates. Each of the end plates is provided with pawl portions which bend at the outer rim. The pawl portions press a part of a side surface of the rotor core. It is described that this rotor can achieve a high-strength structure and effectively suppress leakage flux from the permanent magnet.

JP 2010-183692 A (Patent Document 2) discloses a motor magnet which is inserted in a slot provided in a direction along the axial direction of a rotor. This motor magnet is formed by two or more segment magnets which are stacked in the axial direction of the rotor. An oxide film is formed around each of the segment magnets by the oxidation of the segment magnets.

Further, JP 2005-94845 A (Patent Document 3) discloses a rotor of a permanent magnet type rotary electric machine in which a permanent magnet is inserted and fixed in a magnet insertion hole of a rotor iron core formed by laminating many annular iron core plate members. It is described that the permanent magnet is formed by two or more unit magnets which are aligned in a line in the axial direction and coated with resin to form a bar shape.

RELATED ART DOCUMENT

Patent Document

Patent Document 1: JP 2011-4529 A
Patent Document 2: JP 2010-183692 A
Patent Document 3: JP 2005-94845 A

DISCLOSURE OF THE INVENTION

Problems to be Solved by the Invention

In a permanent magnet embedded in a rotor core in an IPM type rotor described in the above Patent Document 1, an insulation film processing may be performed with an oxide film, resin coating, or the like as described in the above Patent Documents 2 and 3. This is because such an insulation film processing is effective in order to improve motor output by suppressing a magnet eddy-current loss, which increases as eddy-current flowing in the axial direction of the rotor via surface and inside of the permanent magnet increases even if the steel plates are insulated from each other, when a conductive permanent magnet directly contacts a rotor core made from, for example, a steel plate laminate.

However, in order to grow or form the oxide film on a surface of a permanent magnet to have a desired thickness, the permanent magnet should be left for two days, for example, in a particular atmosphere (refer to Patent Document 2). Therefore, a cost increase cannot be avoided because of the longer manufacturing period of the permanent magnet.

Further, as described in the above Patent Document 3, when a resin coating is formed around a permanent magnet in advance, torque output is lowered due to an increased gap between the permanent magnet and the rotor core, in addition to the increase of the manufacturing cost in the permanent magnet.

An object of the present invention is to provide a rotary electric machine rotor, rotary electric machine itself, and a method for manufacturing a rotary electric machine rotor which can suppress an increase of eddy-current loss through a magnet while eliminating the need for insulation film processing on a magnet surface.

Means for Solving the Problems

A rotary electric machine rotor according to the present invention is a rotary electric machine rotor with a built-in magnet. The rotary electric machine rotor includes a rotor core with a magnet insertion hole extending inside; a magnet inserted in the magnet insertion hole; and an insulating filler filled between an inner wall of the magnet insertion hole and the magnet to fix the magnet; wherein the magnet is fixed with the filler such that a surface of the magnet inside the magnet insertion hole is tilted with respect to an extending direction of the inner wall of the magnet insertion hole.

In a rotary electric machine rotor according to the present invention, the magnet insertion hole may be formed along an axial direction of the rotor core; the magnet may have an axial cross section of an elongated quadrilateral shape; and the magnet may contact the inner wall of the magnet insertion hole at a corner on one axial end side and at another corner on the other axial end side which is diagonally opposite to the corner on the one axial end side.

In this case, the magnet may also have an axial cross section of a parallelogram shape and axial end surfaces which are flush with axial end surfaces of the rotor core. Alternatively, the magnet may have an axial cross section of a rectangular shape.

In a rotary electric machine rotor according to the present invention, the magnet may be segmented into a plurality of magnetic pieces; and the filler may be filled between each of the magnet pieces in an integrated fashion in addition to between the inner wall of the magnet insertion hole and the magnet.

A rotary electric machine according to another aspect of the present invention is provided with the rotor having any one of the above structures, and a stator disposed around the rotor.

A method for manufacturing a rotary electric machine rotor according to yet another aspect of the present invention is a manufacturing method of a rotary electric machine rotor with a built-in magnet, including preparing a magnet and a rotor core with a magnet insertion hole extending inside; inserting the magnet into the magnet insertion hole; positioning, in a mold die, the rotor core with the magnet inserted inside; holding the magnet with a portion of the mold die such that a surface of the magnet inside the magnet insertion hole is tilted with respect to an extending direction of an inner wall of the magnet insertion hole; filling an insulating filler between the inner wall of the magnet insertion hole and the magnet through an inlet provided with the mold die to fix the magnet to the rotor core; and assembling, to the shaft, the rotor core in which the magnet is fixed with the filler.

In a method for manufacturing a rotary electric machine rotor according to the present invention, the magnet may have an axial cross section of a parallelogram shape and axial end surfaces which may be flush with axial end surfaces of the rotor core; and in the holding, flat inner side surfaces of the mold die may abut against axial end surfaces of the rotor core and axial end surfaces of the magnet such that the magnet may be held in a tilted position inside the magnet insertion hole.

Further, in a method for manufacturing a rotary electric machine rotor according to the present invention, the magnet may have an axial cross section of a rectangular shape; and in the holding, inclined surfaces of protruding portions which protrude on inner side surfaces of the mold die may abut against axial end surfaces of the magnet and press the magnet in an axial direction such that the magnet may be held in a tilted position inside the magnet insertion hole.

Further, in a method for manufacturing the rotary electric machine rotor according to the present invention, the magnet may have an axial cross section of a rectangular shape; in the holding, inclined surfaces of protruding portions which are elastically provided with the mold die and capable of moving forward and backward may abut corner portions of axial end portions of the magnet and press the axial end portion of the magnet in a direction substantially perpendicular to the axial direction such that the magnet may be held in a tilted position inside the magnet insertion hole.

Effects of the Invention

According to a rotary electric machine rotor of the present invention, a contact area between a magnet and a rotor core is minimized by placing the magnet such that a magnet surface is tilted with respect to the extending direction of an inner wall of a magnet insertion hole. In this way, even with no insulation film formed on the magnet surface, it is possible to avoid a loop path, through which the eddy-current flows into the rotor core via the magnet, from becoming large. Therefore, it becomes possible to suppress an increase of eddy-current loss via a magnet while eliminating the need for insulation film processing on a magnet surface.

BEST MODE FOR CARRYING OUT THE INVENTION

Embodiments according to the present invention (hereinafter referred to as "embodiment") are described below by referring to the attached drawings. In the description, specific shapes, materials, numerals, directions, or the like are provided merely as examples in order to facilitate the understanding of the present invention, and can be appropriately changed in accordance with usages, purposes, and specifications. It is assumed from the beginning that when two or more embodiments and variations are included in the description below, the described features of those embodiments will be appropriately combined to be used.

Figure 1:
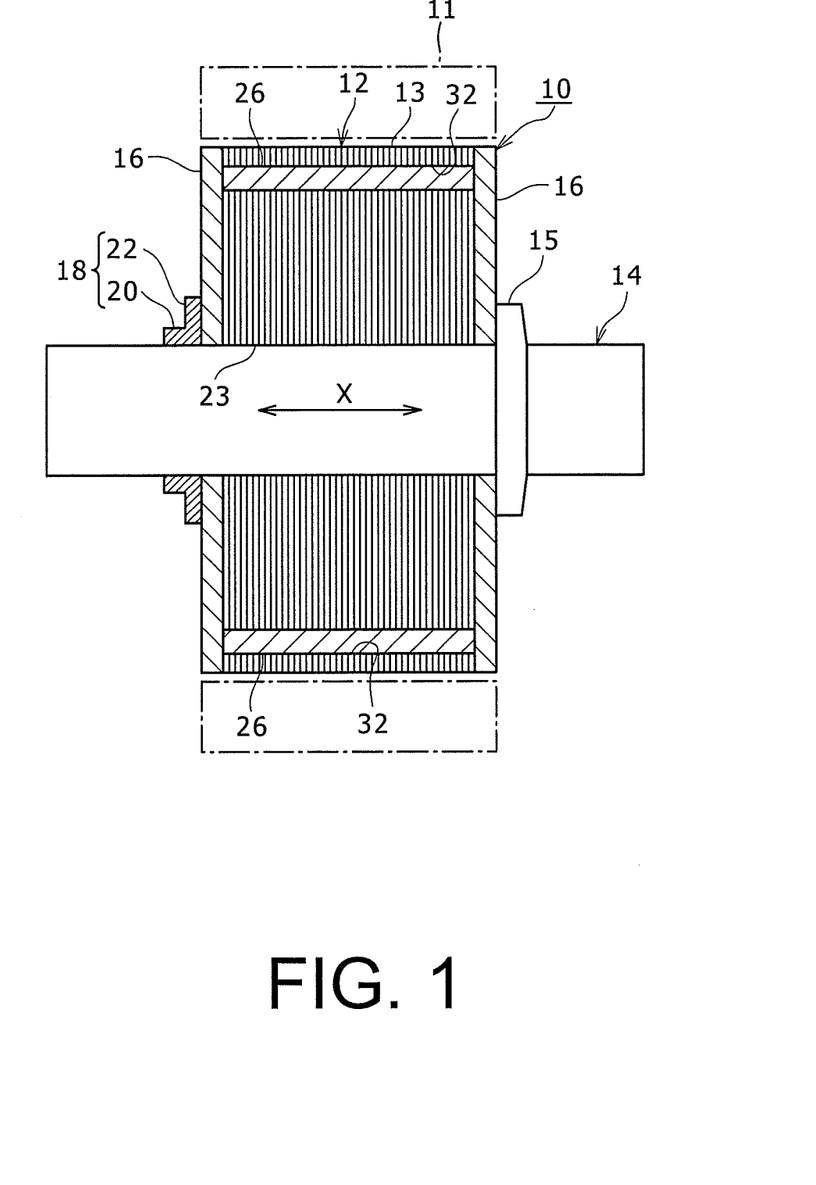
FIG. 1 shows a cross-sectional view along an axial direction of a rotary electric machine rotor according to one embodiment of the present invention.

FIG. 1 is a cross sectional view along the axial direction of a rotary electric machine rotor 10 according to an embodiment of the present invention (hereinafter simply referred to as "rotor"). A cylindrical stator 11 is disposed around the rotor 10 with a predetermined gap therebetween to construct a rotary electric machine. Two or more teeth are provided at the inner circumference of the stator 11 with an equal space between them such that the teeth protrude towards the inside in a radial direction. Between adjacent teeth, opened slots of the same number as the teeth are provided at the inner circumferential side and at both axial ends. Stator coils (not shown) wound around the teeth are inserted in the slots. In this way, when electrical power is applied to the stator coils, a rotating magnetic field which rotates the rotor 10 is formed on the inner side of the stator 11.

The rotor 10 is provided with a cylindrical rotor core 12 having a shaft hole 23 at the radial center; a shaft 14 which is fixed so as to penetrate through the shaft hole 23 of the rotor core 12; endplates 16 placed to contact both sides of the rotor core 12 in the axial direction (shown with arrow X) of the shaft 14 (and rotor core 12); and a fixing member 18 which fixes the rotor core 12 and the endplates 16 to the shaft 14.

The rotor core 12 is formed from many electromagnetic steel plates laminated in the axial direction. Each of the electromagnetic steel plates is processed by cutting out an annular plate from silicon steel plates or the like having a thickness of, for example, 0.3 mm. The electromagnetic steel plates forming the rotor core 12 are integrally coupled by a method such as crimping, adhering, and welding in blocks in which the rotor core 12 is segmented into two or more blocks in an axial direction, or the electromagnetic steel plates forming the rotor core 12 are integrally coupled the as a whole. Each of the electromagnetic steel plates forming the rotor core 12 is electrically insulated from the others by insulation film formed on the surface of the steel plate.

Further, two or more magnetic poles 24 (refer to FIG. 2) are equally spaced from each other in a circumferential direction of the rotor core 12. Each of the magnetic poles 24 includes a pair of permanent magnets described in detail below. Further, the rotor core 12 is located at a predetermined circumferential position on the shaft 14 by interference fit or key fit.

Further, besides the embodiment with a lamination of electromagnetic steel plates, the rotor core 12 may be formed from a pressed powder magnetic core made from magnetic powder such as soft magnetic metal powder or soft magnetic metal oxide powder, both of which are coated by resin binder such as silicon resin. The soft magnetic metal powder may include iron, iron-silicon based alloy, iron-nitrogen based alloy, iron-nickel based alloy, iron-carbon based alloy, iron-boron based alloy, iron-cobalt based alloy, iron-phosphorus based alloy, iron-nickel-cobalt based alloy, and iron-aluminum-silicon based alloy.

The shaft 14 is formed from, for example, a round steel bar. A flange portion 15 which protrudes outward in the radial direction is formed along the outer circumference. When the rotor 10 is assembled, this flange portion 15 abuts one of the end plates 16 and functions as an abutting portion which determines a position of the rotor core 12 on the shaft 14 in the axial direction.

Each of the end plates 16 is formed from a circular plate having an outer shape almost identical to the axial end surface of the rotor core 12. It is preferable that the end plates 16 are formed from a nonmagnetic metal material such as aluminum and copper. The reason for using a nonmagnetic metal material is to suppress a short circuit of magnetic flux at the axial end portions of the permanent magnet forming a magnetic pole. However, as the material is not limited to a metal material as long as the material is nonmagnetic, the endplates 16 may be made from resin. Further, cost may be reduced by making the end plates 16 smaller than the rotor core 12, or eliminating the end plates 16.

The fixing member 18 includes a cylindrical fixing portion 20 which is fixed to the shaft 14; and an annular pressing portion 22 which protrudes outwards in a radial direction from one end portion of the fixing portion 20. The fixing member 18 is fixed on the shaft 14 such that with the rotor core 12 and the two end plates 16 being pressed towards the flange portion 15 by the pressing portion 22, the fixing portion 20 is fixed to the shaft 14 by a fixing method such as crimping, welding, or screwing. In this way, the rotor core 12 is fixed to the shaft 14 together with the end plates 16.

Figure 2:
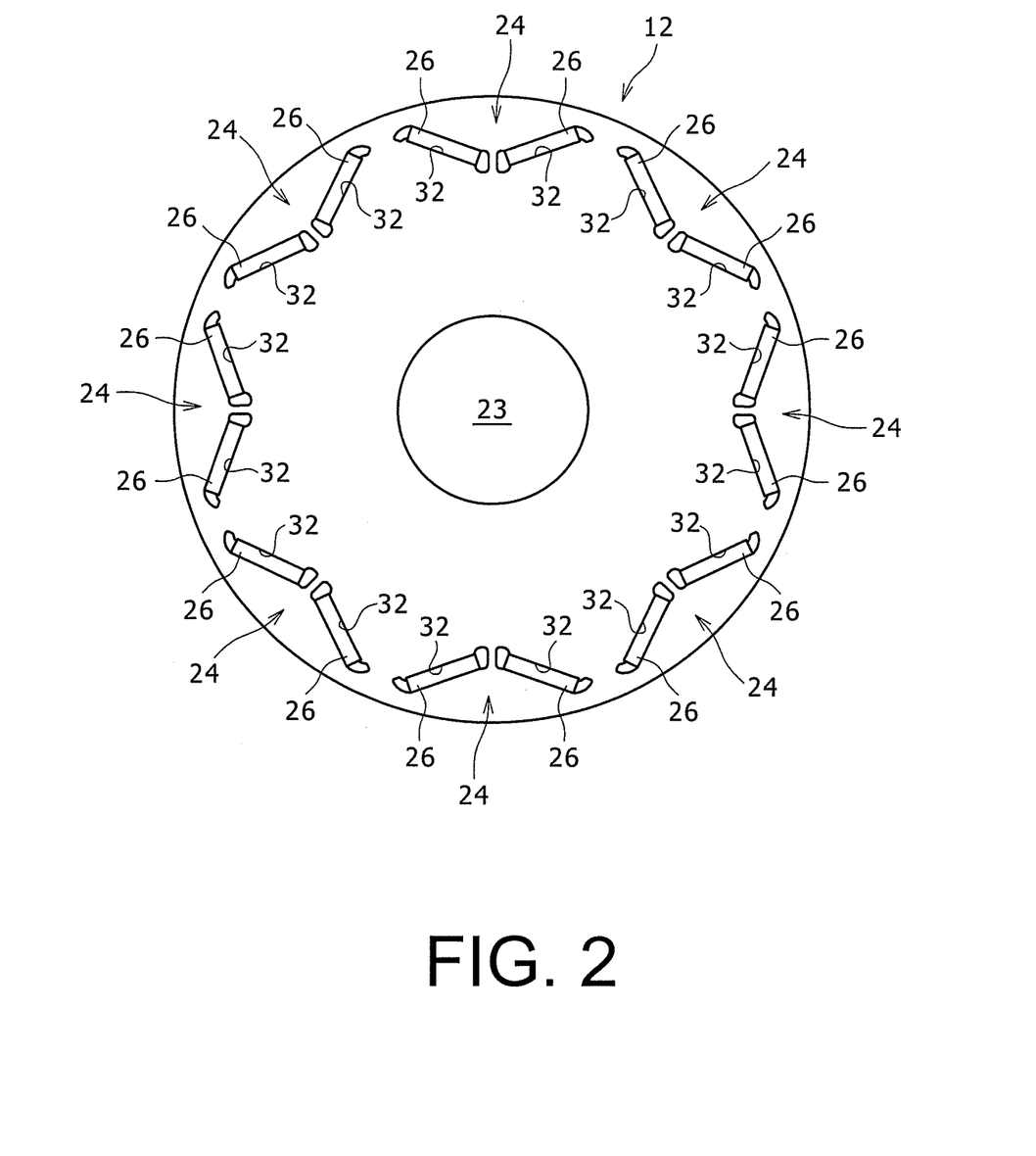
FIG. 2 shows an axial end surface of the rotor core shown in FIG. 1.
Figure 3:
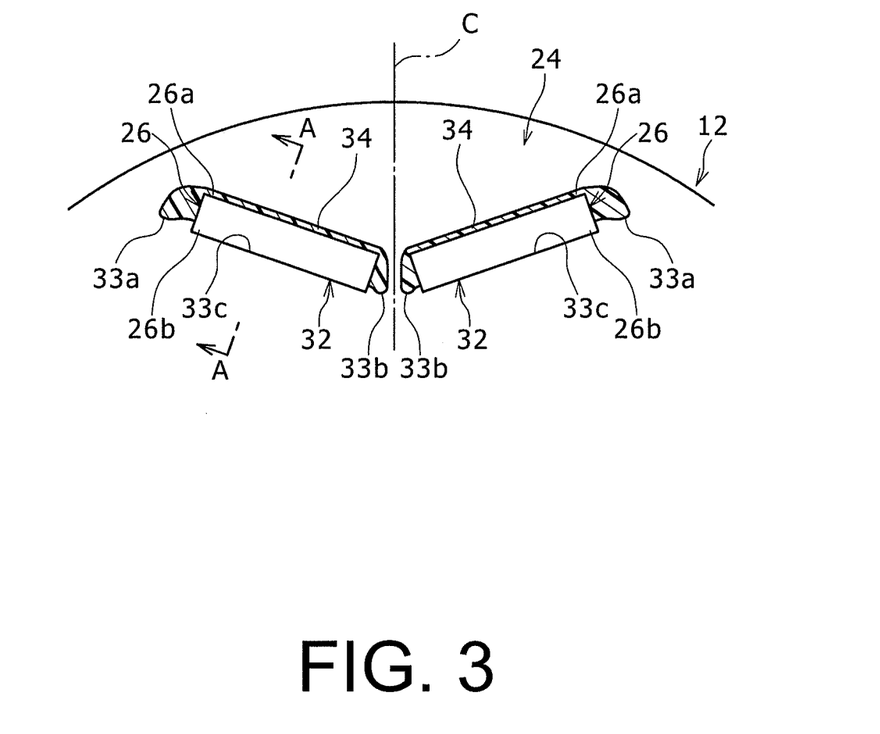
FIG. 3 shows an enlarged view of one magnetic pole of the rotor core shown in FIG. 2.
Figure 4:
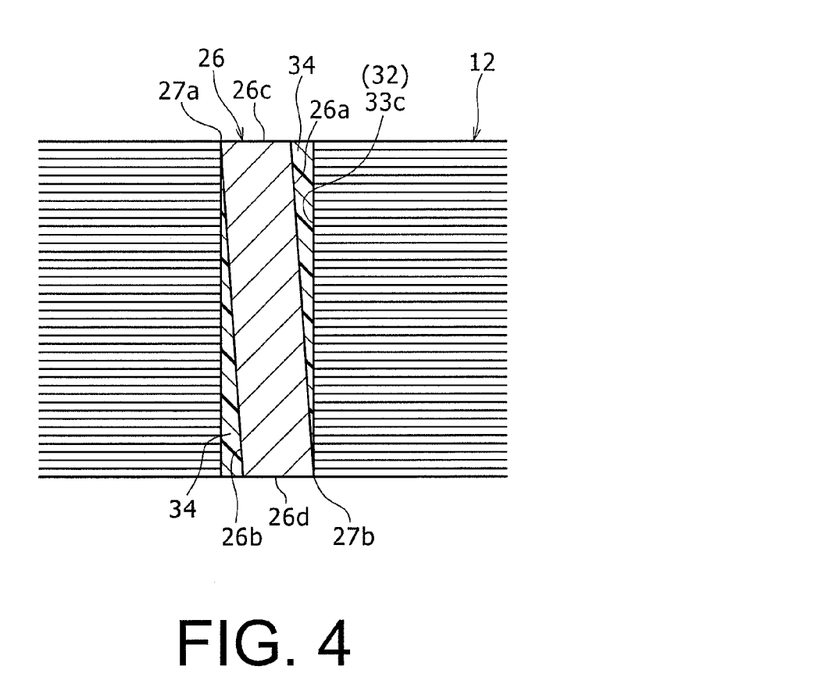
FIG. 4 shows a cross sectional view taken along a line A-A in FIG. 3.

Next, the structure of the rotor core 12 is described by referring to FIGS. 2, 3, and 4. While FIG. 2 shows an axial end surface of the rotor core 12, a cross section of the rotor core 12 vertical to the axial direction has the same structure. FIG. 3 shows an enlarged view of one of the magnet poles 24 in FIG. 2. Further, FIG. 4 is a cross sectional view taken along the line A-A in FIG. 3.

At the center of the rotor core 12 having a cylindrical outer shape, a shaft hole 23 penetrating through the rotor core 12 is provided, through which the shaft 14 is inserted and fixed. When the rotor core 12 is fixed to the shaft 14 by interference fit, the shaft hole 23 has a circular shape and no keys are provided at the edge portion as shown in FIG. 2. On the contrary, when the rotor core 12 is installed on the shaft 14 by key fit, keys (or key grooves) are provided to protrude (or to be recessed) at the edge portion of the shaft hole 23.

Two or more magnetic poles 24 are provided equally spaced apart along an outer circumference of the rotor core 12. The present embodiment shows, as an example, eight magnetic poles 24 which are disposed at intervals of 45 degrees in the circumferential direction. As each magnetic pole 24 has an identical structure except the magnetized direction of the permanent magnet 26, one magnetic pole 24 is described below.

Each magnetic pole 24 includes a pair of the permanent magnets 26. Each pair of the permanent magnets 26 is embedded inside the rotor core 12 at a position near to the outer circumferential surface 13. As shown in FIG. 3, two permanent magnets 26 included in each magnetic pole 24 have an identical shape and size. Specifically, each permanent magnet 26 has an axial end surface (and cross section) of an elongated rectangular shape with two short side surfaces and two long side surfaces. The permanent magnet 26 is formed to have substantially the same length as the rotor core 12 in the axial direction. However, the shape and the size of the permanent magnet 26 are not limited to the arrangements described above, and each permanent magnet 26 may have different shapes and sizes.

Each of the pair of the permanent magnets 26 in each of the magnetic poles 24 is inserted and fixed in a magnet insertion hole 32. The two permanent magnets 26 are arranged in a substantially V-shape opening towards the outer circumferential surface 13 of the rotor core 12. Each of the pair of the permanent magnets 26 is arranged to be symmetrical about the magnetic pole center line C which is a line drawn in a radial direction passing through the circumferential center of the magnetic pole. However, the pair of the permanent magnets 26 are not limited to this arrangement and each of the pair of the permanent magnets 26 may be arranged asymmetrically about the magnetic pole center line C.

For each of the permanent magnets 26 according to the present embodiment, a first polarity is magnetized on one of the two long side surfaces which is on the outer side in the radial direction, while a second polarity which is different from the first polarity is magnetized on the other long side surface which is on the inner side in the radial direction. Specifically, at one pair of the permanent magnets 26 included in one magnetic pole 24, an N-pole is magnetized on one side surface on the outer side in the radial direction, while an S-pole is magnetized on the other side surface. On the contrary, at another pair of the permanent magnets 26 of the magnetic poles 24 which is placed adjacent to the former pair of the permanent magnets 26 along the circumferential direction, an S-pole is magnetized on one side surface which is on the outer side in the radial direction, while an N-pole is magnetized on the other side surface. Therefore, in the permanent magnets 26, magnetization direction is through the thickness in the direction perpendicular to the two long side surfaces, while the two short side surfaces are arranged along the magnetization direction.

The magnet insertion hole 32 in which the permanent magnet 26 is inserted includes a magnet enclosure portion 33c for enclosing the permanent magnet 26. The magnet enclosure portion 33c is structured to have a rectangular shape substantially identical to but slightly larger than the cross section of the permanent magnet 26. Further, pocket portions 33a, 33b are formed at the two circumferential ends of the magnet insertion hole 32 such that the pocket portions 33a, 33b extends outwardly from the short side surfaces of the permanent magnet 26 to communicate with the magnet enclosure portion 33c. The pocket portions 33a, 33b are formed narrower than the permanent magnet 26 so as to prevent the permanent magnet 26 from entering into the pocket portions 33a, 33b.

As shown in FIG. 4, the permanent magnet 26 has an axial cross section of an elongated quadrilateral shape. More specifically, the permanent magnet 26 has an axial cross section of an elongated parallelogram shape. The magnet insertion hole 32 is formed along the axial direction of the rotor core 12 so as to internally include a rectangular space extending in the axial direction. The permanent magnet 26 is arranged in a position in which the long side surfaces 26a, 26b (magnet surfaces) inside the magnet insertion hole 32 is tilted with respect to the inner wall of the magnet insertion hole 32 which is arranged parallel to the axial direction.

Because the permanent magnet 26 is formed to have an axial length substantially equal to that of the rotor core 12, axial end surfaces 26c, 26d are substantially flush with both of the axial end surfaces of the rotor core 12. Further, a corner portion 27a on one axial end side (top in FIG. 4) of the permanent magnet 26 and another corner portion 27b on the other axial end side (bottom in FIG. 4) which is diagonally opposite to the corner portion 27a contact the inner wall of the magnet insertion hole 32, that is the rotor core 12. It should be noted that in the permanent magnet 26, the corner portion 27a is an edge portion defined by the long side surface 26b and the axial end surface 26c, while the corner portion 27b is an edge portion defined by the long side surface 26a and the axial end surface 26d.

As described above, spaces having a taper shape extending in the axial direction are respectively formed between the long side surfaces 26a, 26b of the permanent magnet 26 which is placed in a tilted position inside the magnet insertion hole 32 and the inner wall of the magnet insertion hole 32. An insulating filler 34 is filled in the space, thereby fixing the permanent magnet 26 inside the magnet insertion hole 32.

As the filler 34, a resin material having a thermosetting property such as epoxy resin and silicon resin is preferably used. However, as the filler 34 is not limited to such a resin material, a thermoplastic resin material may be used as the filler 34. Further, filler having a high thermal conductivity (such as silica filler) may be mixed with the filler 34 in order to suppress temperature rise of the permanent magnet 26 by improving thermal conductivity to the rotor core 12. Filler having a high permeability (for example, iron powder) may be mixed with the filler 34 in order to suppress a decline in the amount of magnetic flux from the permanent magnet 26 by enhancing permeability of the filler 34.

Although it is preferable that the filler 34 is filled between the long side surfaces 26a, 26b of the permanent magnet 26 and the inner wall of the magnet insertion hole 32 without any gaps, a gap may be left in the filling as long as sufficient adhesive strength of the permanent magnet 26 to the rotor core 12 is achieved.

As shown in FIG. 3, the insulating filler 34 is also filled inside the pocket portions 33a, 33b of the magnet insertion hole 32. In this way, pocket portions 33a, 33b of the magnet insertion hole 32 can be assumed to be an area having a relatively low permeability. By providing such a low permeability area facing the short side surfaces which are arranged along the magnetize direction of the permanent magnet 26, it becomes possible to effectively suppress flux leakage and short circuit between the front and back surfaces at the circumferential end portions of the permanent magnet 26. In this way, a decline in the amount of flux directed from the permanent magnet 26 to the outer circumference of the rotor can be suppressed, achieving enhanced motor output.

Figure 5:
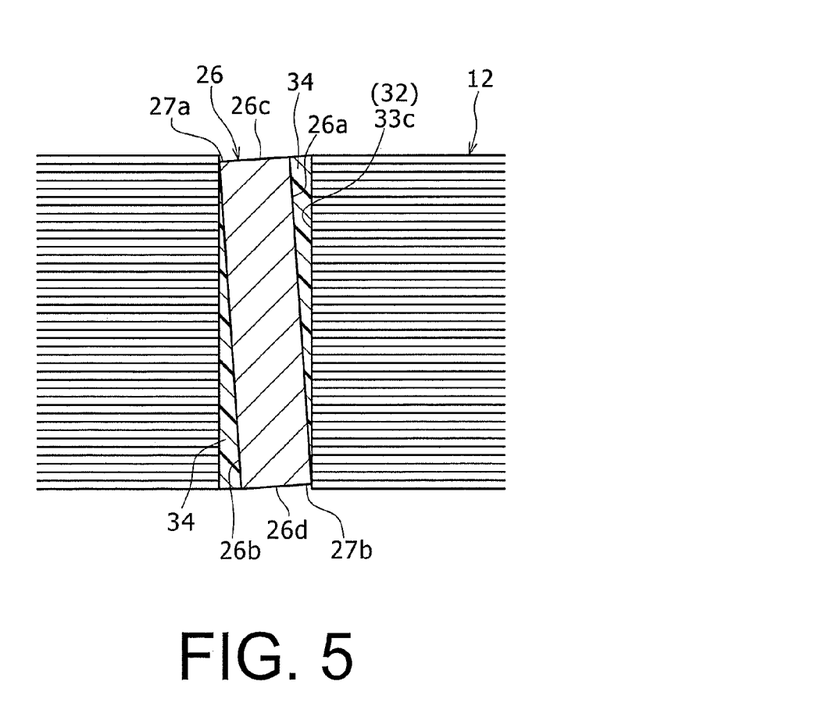
FIG. 5 shows a cross sectional view similar to FIG. 4, with an example with a permanent magnet having an axial cross section of a rectangular shape.

Although the permanent magnet 26 is described to have an axial cross section of a parallelogram shape, the shape of the permanent magnet 26 is not limited to this shape. As shown in FIG. 5, the permanent magnet 26 having an axial cross section of a rectangular shape may be used. By applying such a shape to the permanent magnet 26, it becomes possible to improve yields when manufacturing by cutting out the permanent magnets from magnetic material blocks, achieving lower manufacturing cost.

Figure 6:
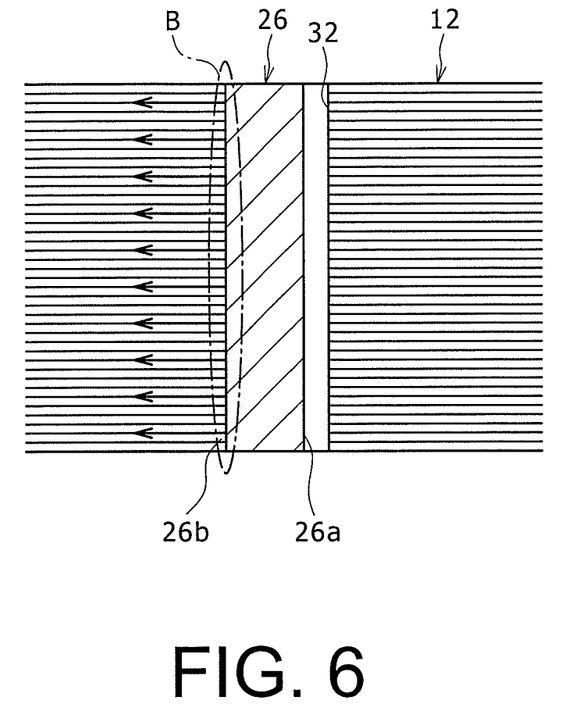
FIG. 6 shows a schematic diagram describing how eddy-current flows into magnetic steel plates forming a rotary core via a surface of a permanent magnet on which no insulation film processing is performed.

FIG. 6 shows a view in which the permanent magnet 26 with conductivity to which insulation film processing is not applied is fixed so as to contact the inner wall of the magnet insertion hole 32 on one side. In this case, as shown in an area B enclosed by a dash-dot line in FIG. 6, the contact surface 26b between the permanent magnet 26 and the rotor core 12 becomes conductive with many laminated electromagnet steel plates, being insulated from each other, resulting in a large loop path of eddy-current which flows via the magnet surface 26a. This increases the eddy-current loss of the rotor which rotates in a variable magnetic field, lowering torque rate efficiency in the rotating electric machine.

On the contrary, according to the rotor 10 described above, because the permanent magnet 26 is provided in a tilted position with respect to the extending direction of the inner wall of the magnet insertion hole 32, the contact portion between the permanent magnet 26 and the rotor core 12 can be limited to a small area, which is the corner portion 27a on the one axial end side and the corner portion 27b on the other axial end side.

More specifically, the contact portion between the permanent magnet 26 and the rotor core 12 can be limited to, for example, about two or several plates at the two axial ends among the electromagnetic steel plates forming the rotor core 12. In this way, it becomes possible to avoid forming a large eddy-current loop path in which eddy-current flows to the rotor core 12 via the permanent magnet 26 even when insulation film is not formed on the surface of the permanent magnet 26.

Therefore, it is possible to suppress increase of the eddy-current loss via the permanent magnet 26 while eliminating the need for the insulation film processing on the permanent magnet 26.

Further, because it becomes possible to use the permanent magnet 26 without the insulation film processing such as oxide coating and resin coating, cost reduction can be achieved because of the reduced period and processes required for manufacturing the permanent magnet 26.

Figure 7:
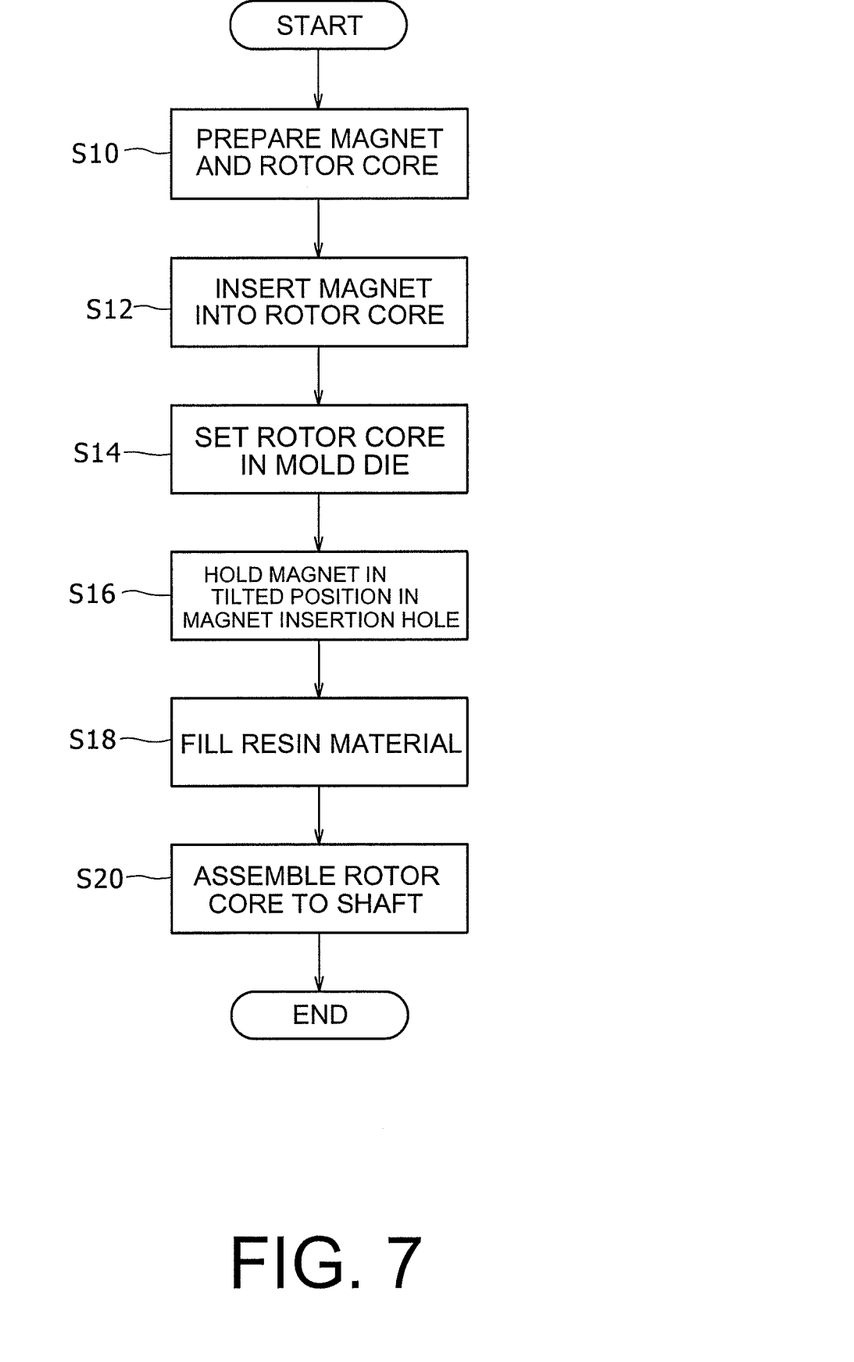
FIG. 7 shows a flow chart describing a manufacturing method of a rotary electric machine rotor according to the present embodiment.

Next, a manufacturing method of the rotor 10 according to the present embodiment is described by referring to FIG. 7. FIG. 7 is a flow chart showing a manufacturing process of the rotor 10.

First, at step S10, the permanent magnets 26 and a rotor core 12 in which the magnet insertion holes 32 are formed are prepared.

Subsequently, at step S12, the permanent magnets 26 are inserted into the magnet insertion holes 32 of the rotor core 12 from the axial direction.

Figure 8:
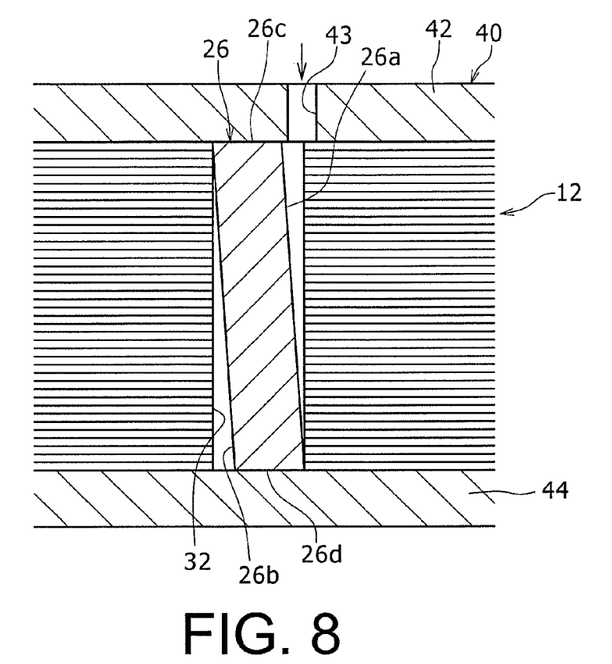
FIG. 8 shows a view in which a permanent magnet having an axial cross section of a parallelogram shape is held in a tilted position inside a magnet insertion hole of a rotor core by a mold die.

At step S14, as shown in FIG. 8, the rotor core 12 with the permanent magnets 26 inserted is set inside a mold die 40.

Each of a top die 42 and a bottom die 44 forming the mold die 40 includes a flat inner side surface so as to form a wide surface contacting the axial end surfaces of the rotor core 12. Because the axial end surfaces 26c, 26d of the permanent magnet 26 being flush with the end surfaces of the rotor contact the inner side surfaces of the top die 42 and the bottom die 44, the permanent magnet 26 is held in a tilted position inside the magnet insertion hole 32 of the rotor core 12 in the subsequent step S16.

Then, in step S18, a resin material is injected into the die from an inlet 43 formed with the top die 42 of the mold die 40 to be filled in the pocket portions 33a, 33b of the magnet insertion hole 32 and in a gap between the long side surfaces 26a, 26b of the permanent magnet 26 and the inner wall of the magnet insertion hole 32. In this way, the permanent magnet 26 is fixed inside the magnet insertion hole 32 of the rotor core 12.

The rotor core 12 in which the permanent magnet 26 is fixed as described above is retrieved from the mold die 40. In the subsequent step S20, the rotor core 12 is assembled with the shaft 14, the end plates 16, and the fixing member 18. In this way, the manufacture of the rotor 10 is completed.

Figure 9:
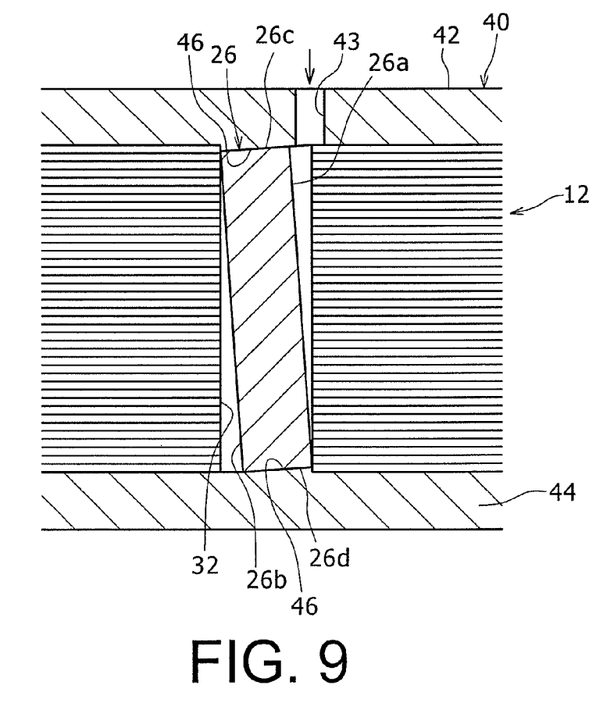
FIG. 9 shows a view in which a permanent magnet having an axial cross section of a rectangular shape is held in a tilted position inside a magnet insertion hole of a rotor core by a mold die.

FIG. 9 shows a view in which a permanent magnet 26 having an axial cross section of a rectangular shape is held in a tilted position inside the magnet insertion hole 32 of the rotor core 12 by the mold die 40. In this case, a protruding portion 46 which corresponds to the magnet insertion hole 32 and has a tilting end surface is provided on each of the inner side surfaces of the top die 42 and the bottom die 44 of the mold die 40. In this way, the permanent magnet 26 inserted in the magnet insertion hole 32 is held in a tilted position inside the magnet insertion hole 32 by the tilting end surfaces of the protruding portions 46 which abut and press the axial end surfaces 26c, 26d in the axial direction.

Figure 10:
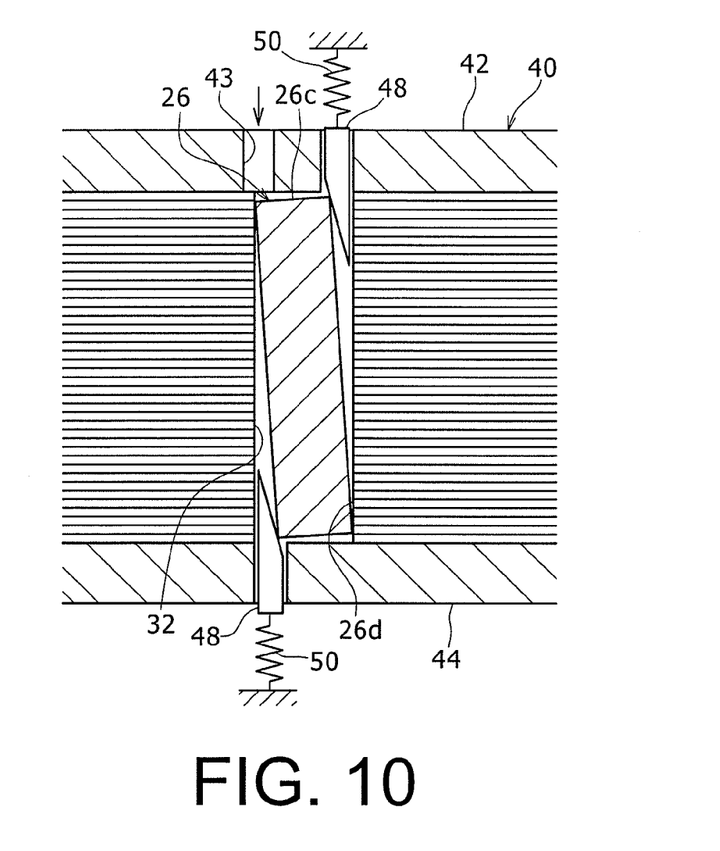
FIG. 10 shows another example in which a permanent magnet having an axial cross section of a rectangular shape is held in a tilted position inside a magnet insertion hole of a rotor core by a mold die.

FIG. 10 shows another example in which a permanent magnet 26 having an axial cross section of a rectangular shape is held in a tilted position inside a magnet insertion hole 32 of a rotor core 12 by a mold die 40. In this case, pins 48 which are protruding members are respectively provided with the top die 42 and the bottom die 44 of the mold die such that the pins 48 can be moved forward and backward. A tapered surface is formed at the tip portion of the pins 48. The pins 48 are pressed towards the inside of the mold die 40 by an elastic member 50 such as a spring or rubber. In this way, the taper surfaces of the elastically provided pins 48 abut and press the corner portions of the axial end portions of the permanent magnet 26 in a direction substantially perpendicular to the axial direction such that the permanent magnet 26 is held in a tilted position inside the magnet insertion hole 32. Because the pins 48 are elastically provided so that the pins 48 can be moved forward and backward, excessive contact pressure applied to the permanent magnet 26 by the pins 48 can be avoided, preventing the permanent magnet 26 from being damaged.

It should be noted that a rotor according to the present invention is not limited to the above embodiments and their variations. Various changes and improvements are possible as long as they do not depart from essentials within the scope of the claims.

For example, although one pair of the permanent magnets 26 is described to be included in each magnetic pole 24 of the rotor 10 in the above embodiments, the number of permanent magnet included in each magnetic pole may also be one or more than three.

Figure 11:
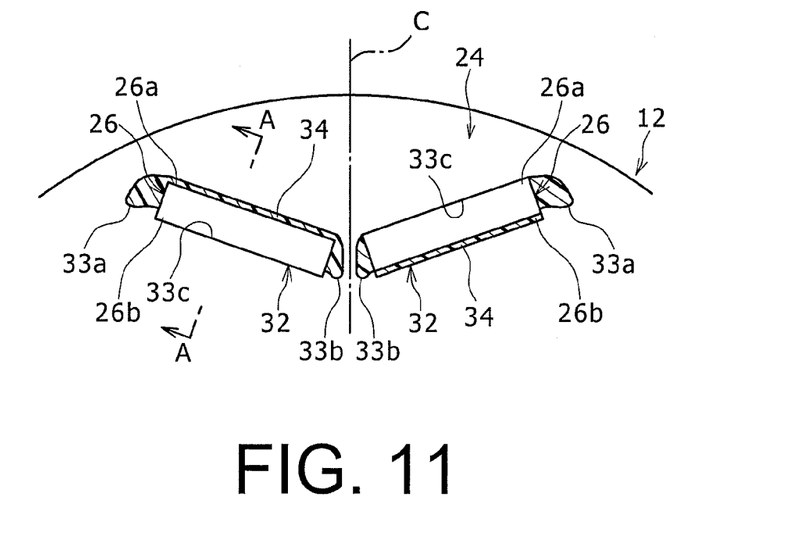
FIG. 11 shows a view similar to FIG. 3, with a variation of rotary electric machine rotor according to the present invention.

Further, in a case where a pair of permanent magnets 26 are included in one magnetic pole 24 as shown in FIG. 11, one permanent magnet 26 and the other permanent magnet 26 may have different tilted directions inside the magnet insertion hole 32. In other words, at one axial end surface of the rotor core 12, one permanent magnet 26 may contact the rotor core 12 at the corner on the outer circumferential side, and the other permanent magnet 26 may contact at the corner on the inner circumferential side. In this way, it becomes possible to achieve an advantage that the amount of magnetic flux of one magnetic pole 24 in the axial direction can be leveled.

Figure 12:
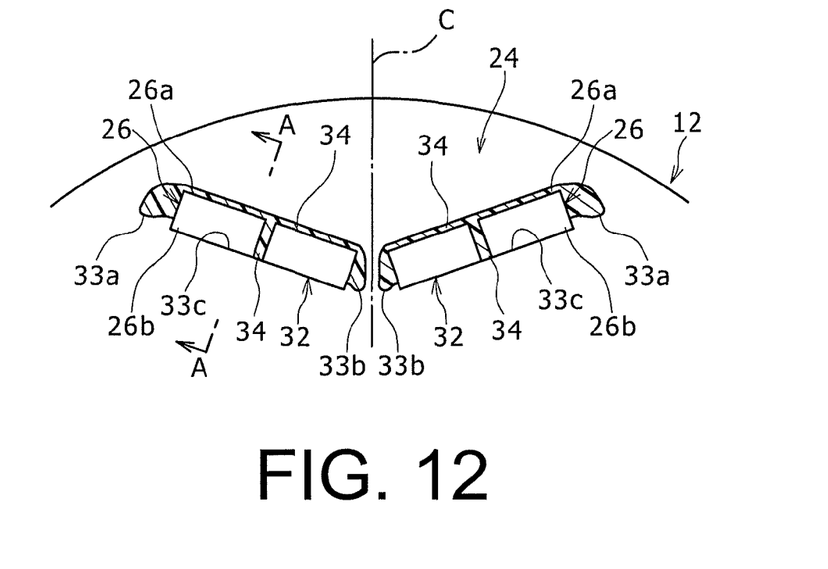
FIG. 12 shows a view similar to FIG. 3, with another variation of rotary electric machine rotor according to the present invention.
Figure 13:
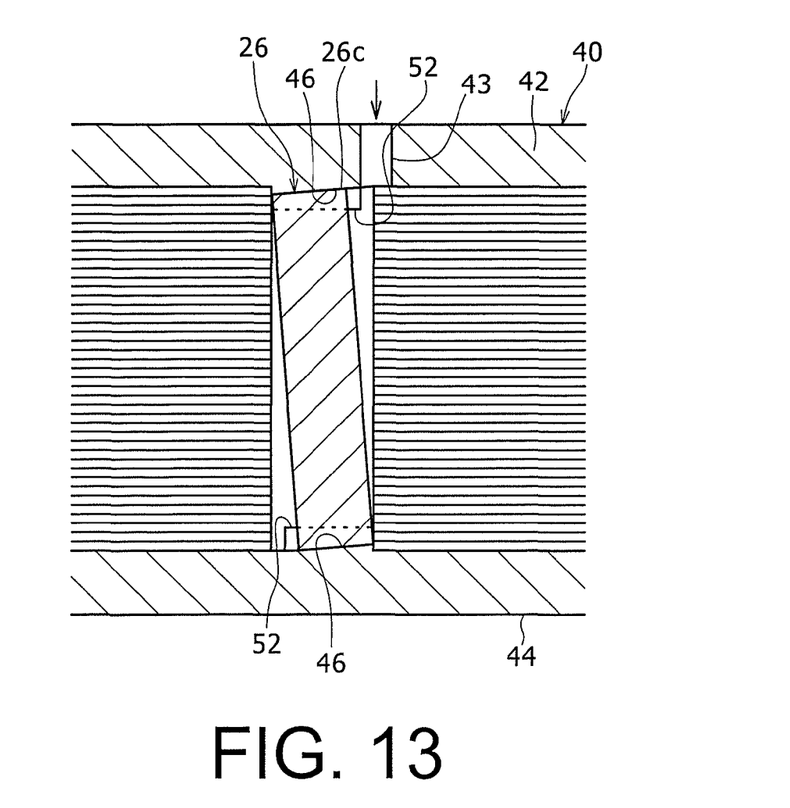
FIG. 13 shows a view similar to FIG. 9, with the rotor core of the variation shown in FIG. 12 set in a mold die.

Further, as shown in FIG. 12, each permanent magnet 26 included in the magnetic pole 24 may be segmented into, for example, two or more in the long side surface direction. In such a case, the filler 34 is integrally filled between each of the segmented pieces of the magnet in addition to between the permanent magnet 26 and the magnet insertion hole 32. In this way, it becomes possible to obtain insulation properties between each of the magnet pieces, achieving suppression of magnet eddy-current loss. This can be achieved by providing, between the two magnet pieces placed in the magnet insertion hole 32a, thin-plate shaped spacers 52 which respectively protrude from the top die 42 and the bottom die 44 as shown in FIG. 13, and fill the filler 34 in such a condition.

REFERENCE NUMERALS 10 rotary electric machine rotor, 11 stator, 12 rotor core, 13 outer circumferential surface, 14 shaft, 15 flange portion, 16 end plate, 18 fixing member, 20 fixing portion, 22 pressing portion, 23 shaft hole, 24 magnetic pole, 26 permanent magnet, 26a, 26b long side surfaces, 32 magnet insertion hole, 33a, 33b pocket portions, 33c magnet enclosure portion, 34 filler, 40 mold die, 42 top die, 44 bottom die, 46 protruding portion, 48 pin, 50 elastic member, and 52 spacer.

The invention claimed is:

1. A rotary electric machine rotor with a built-in magnet, the rotary electric machine rotor comprising:
   a rotor core with a magnet insertion hole extending inside;
   a magnet inserted in the magnet insertion hole; and
   an insulating filler filled between an inner wall of the magnet insertion hole and the magnet to fix the magnet,
   wherein the magnet is fixed with the filler such that a radial inner surface and a radial outer surface of the magnet inside the magnet insertion hole are tilted with respect to an extending direction of the inner wall of the magnet insertion hole.

2. The rotary electric machine rotor according to claim 1, wherein
   the magnet insertion hole is formed along an axial direction of the rotor core;

the magnet has an axial cross section of an elongated quadrilateral shape; and the magnet contacts the inner wall of the magnet insertion hole at a corner on one axial end side and at another corner on the other axial end side which is diagonally opposite to the corner on the one axial end side.

3. The rotary electric machine rotor according to claim 2, wherein the magnet has an axial cross section of a parallelogram shape and axial end surfaces which are flush with axial end surfaces of the rotor core.

4. The rotary electric machine rotor according to claim 2, wherein the magnet has an axial cross section of a rectangular shape.

5. The rotary electric machine rotor according to claim 1, wherein the magnet is segmented into a plurality of magnetic pieces; and the filler is integrally filled between each other of the magnet pieces in addition to between the inner wall of the magnet insertion hole and the magnet.

6. A rotary electric machine comprising:

the rotor according to claim 1; and a stator disposed around the rotor.

7. A method for manufacturing a rotary electric machine rotor with a built-in magnet, the method comprising:

preparing a magnet and a rotor core with a magnet insertion hole extending inside;

inserting the magnet into the magnet insertion hole;

positioning, in a mold die, the rotor core with the magnet inserted inside;

holding the magnet with a portion of the mold die such that a radial inner surface and a radial outer surface of the magnet inside the magnet insertion hole are tilted with respect to an extending direction of an inner wall of the magnet insertion hole;

filling an insulating filler between the inner wall of the magnet insertion hole and the magnet through an inlet provided with the mold die to fix the magnet to the rotor core; and assembling, to the shaft, the rotor core in which the magnet is fixed with the filler.

8. The method for manufacturing the rotary electric machine rotor according to claim 7, wherein the magnet has an axial cross section of a parallelogram shape and axial end surfaces which are flush with axial end surfaces of the rotor core; and in the holding, flat inner side surfaces of the mold die abut axial end surfaces of the rotor core and axial end surfaces of the magnet such that the magnet is held in a tilted position inside the magnet insertion hole.

9. The method for manufacturing the rotary electric machine rotor according to claim 7, wherein the magnet has an axial cross section of a rectangular shape; and in the holding, inclined surfaces of protruding portions which protrude on inner side surfaces of the mold die abut axial end surfaces of the magnet and press the magnet in an axial direction such that the magnet is held in a tilted position inside the magnet insertion hole.

10. The method for manufacturing the rotary electric machine rotor according to claim 7, wherein the magnet has an axial cross section of a rectangular shape; and in the holding, inclined surfaces of protruding portions which are elastically provided with the mold die and capable of moving forward and backward abut corner portions of axial end portions of the magnet and press the axial end portions of the magnet in a direction substantially perpendicular to the axial direction such that the magnet is held in a tilted position inside the magnet insertion hole.

* * * * *